(12) United States Patent
Cowie

(10) Patent No.: US 7,024,781 B1
(45) Date of Patent: Apr. 11, 2006

(54) VIAL ILLUMINATION FEATURE FOR A TOOL SUCH AS A LEVEL

(75) Inventor: Jeffrey P. Cowie, Milwaukee, WI (US)

(73) Assignee: Johnson Level & Tool Mfg. Co., Inc., Meguon, WI (US)

( * ) Notice: Subject to any disclaimer, the term of this patent is extended or adjusted under 35 U.S.C. 154(b) by 0 days.

(21) Appl. No.: 10/228,579

(22) Filed: Aug. 27, 2002

(51) Int. Cl.
*G01C 9/32* (2006.01)

(52) U.S. Cl. .......................................... 33/348; 33/381

(58) Field of Classification Search ................ 33/348, 33/348.2, 365, 377, 379, 381, 451, 382; 362/84, 362/101, 318, 119
See application file for complete search history.

(56) References Cited

U.S. PATENT DOCUMENTS

| | | | | |
|---|---|---|---|---|
| 674,107 A | * | 5/1901 | Traut | 33/379 |
| 2,344,241 A | * | 3/1944 | Flint | 33/348.2 |
| 2,362,872 A | * | 11/1944 | Weagle | 33/348 |
| 2,813,349 A | * | 11/1957 | Harris | 33/348 |
| 2,877,561 A | * | 3/1959 | Morse | 33/368 |
| 3,368,287 A | * | 2/1968 | Ault | 33/348 |

(Continued)

FOREIGN PATENT DOCUMENTS

GB       2248938 A   * 10/1990

(Continued)

OTHER PUBLICATIONS

International Search Report dated Sep. 4, 2003.

*Primary Examiner*—G. Bradley Bennett
(74) *Attorney, Agent, or Firm*—Boyle, Fredrickson, Newholm, Stein & Gratz, S.C.

(57) ABSTRACT

A vial illumination feature for a tool, such as a level, is configured so as to emit light toward a vial when the tool is used in a darkened environment. The vial extends across an opening or a space defined by the tool, and one or more vial retainer members engage the ends of the vial to maintain the vial in position within the opening or space. The vial illumination feature is carried out by forming the one or more vial retaining members of a luminescent material. The luminescence of the one or more vial retaining members functions to absorb light when the tool is exposed to light, and to emit light toward the surfaces of the vial when the tool is in a darkened environment, to illuminate the vial and to enable the bubble of the vial to easily be viewed.

8 Claims, 4 Drawing Sheets

U.S. PATENT DOCUMENTS

| | | | | |
|---|---|---|---|---|
| 3,589,014 A | * | 6/1971 | Sarl | 33/286 |
| 3,738,015 A | * | 6/1973 | De Jong | 33/379 |
| 3,766,657 A | * | 10/1973 | Hopkins | 33/348 |
| 4,103,430 A | * | 8/1978 | Schrader | 33/348 |
| 4,164,077 A | * | 8/1979 | Thomas | 33/348 |
| 4,332,046 A | * | 6/1982 | Foley et al. | 7/146 |
| 4,407,075 A | * | 10/1983 | MacDermott et al. | 33/348.2 |
| 4,466,197 A | * | 8/1984 | Staempfli | 33/377 |
| 4,610,094 A | * | 9/1986 | Robson et al. | 33/367 |
| 4,912,854 A | * | 4/1990 | Weadon | 33/348.2 |
| 4,932,133 A | * | 6/1990 | Bruhn | 33/377 |
| 4,996,777 A | * | 3/1991 | Grosz | 33/379 |
| 5,033,199 A | * | 7/1991 | Wilcox et al. | 33/379 |
| 5,105,549 A | * | 4/1992 | Johnson | 33/379 |
| 5,199,177 A | * | 4/1993 | Hutchins et al. | 33/348 |
| 5,406,714 A | * | 4/1995 | Baker et al. | 33/382 |
| 5,686,022 A | * | 11/1997 | Murayama et al. | 252/301.412 |
| 6,148,530 A | * | 11/2000 | Jacoff et al. | 33/377 |
| 6,760,975 B1 | * | 7/2004 | Schmidt | 33/382 |

FOREIGN PATENT DOCUMENTS

GB 2250091 5/1992

* cited by examiner

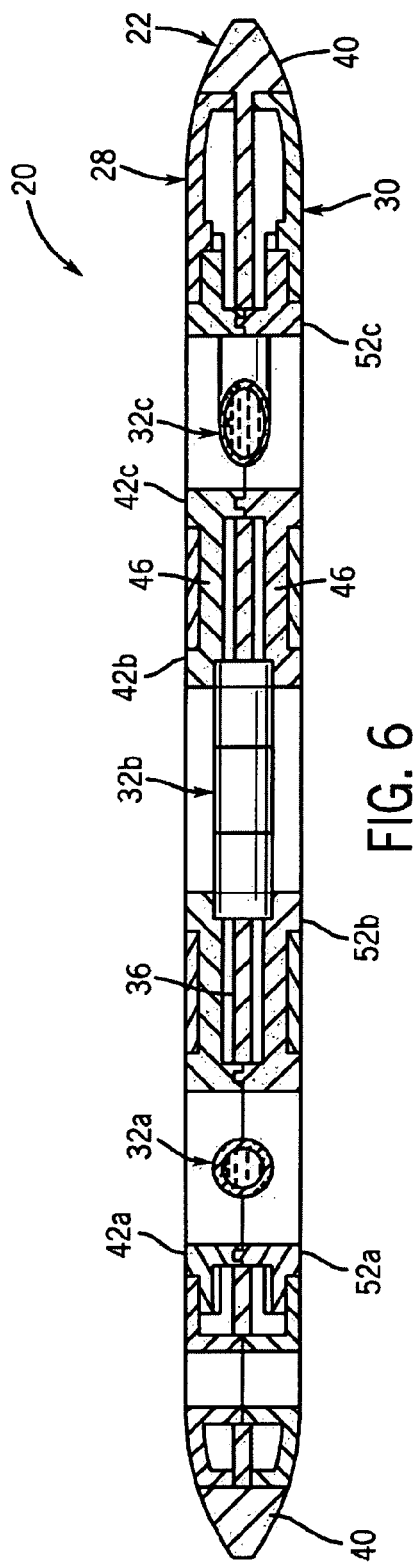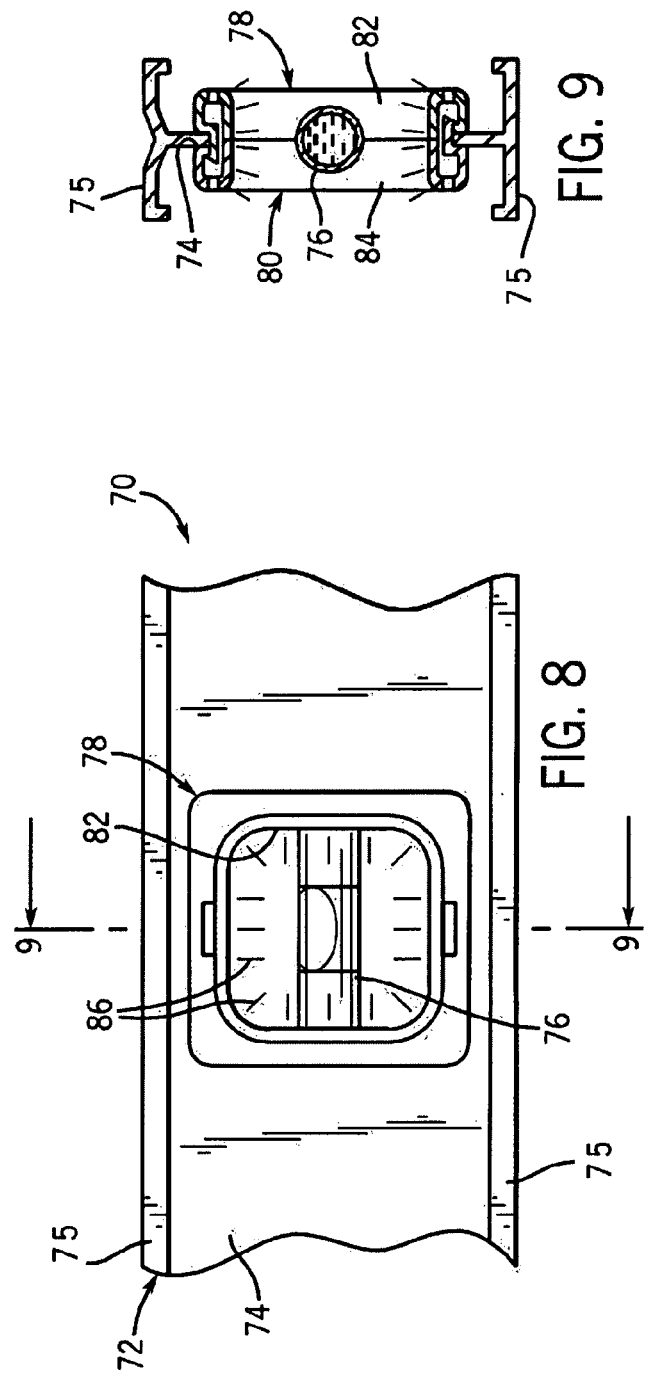

VIAL ILLUMINATION FEATURE FOR A TOOL SUCH AS A LEVEL

FIELD OF THE INVENTION

The invention relates to levels or other tools containing a bubble vial, and more particularly to such tools that have a vial that is surrounded by a cover arrangement for retaining the vial in position on the tool.

BACKGROUND OF THE INVENTION

A bubble vial is typically incorporated into a tool, such as a level, to provide an indication as to the orientation of the tool, e.g. relative to a horizontal, vertical, or a diagonal plane. The vial contains a quantity of fluid and a bubble, and the user views the position of the bubble within the vial to ascertain the position of the tool relative to the plane.

A bubble vial consists of a tubular member formed of a transparent material having a volume of fluid in its interior. Typically, a vial is constructed by filling a cylindrical member with fluid and then securing a cap to the open end of the cylindrical member to seal the interior of the cylindrical member and retain the fluid therein. The fluid occupies less than the entire volume of the closed interior of the cylindrical member, to form a bubble. The transparent material of the cylindrical member enables the bubble to be viewed from the exterior of the vial after it has been constructed as described.

Bubble vials are mounted to a frame of a level in a variety of ways. In one arrangement, a metal frame includes a web located between a pair of spaced flanges that define the gauging surfaces of the level. The web is provided with a series of openings and each opening includes a structure, such as a pair of notches, for receiving the ends of the vial such that the vial extends across the opening. A pair of plastic side covers are located one on each side of the frame. The side covers are connected together, such as by sonic welding or a snap fit arrangement, and the frame web and the vials are disposed between the side covers to form a composite level construction in which the side covers function to retain the vials in position within the web openings. Alternatively, a pair of separate covers can be provided for each vial. Each pair of vial covers is engaged together with the frame web and the vial therebetween, such that each pair of vial covers functions to retain one of the vials in position.

In another arrangement, a level body is provided with a series of openings, and vial-retaining structure is associated with each opening so as to retain the vials within the opening. In a wood level construction, openings are formed in the wood frame for receiving one or more vials. The vials are retained in the openings by plastic retainers that are received within the openings and engaged with the vials for maintaining the vials in position. Transparent lenses are mounted on either side of the frame over the opening for protecting the vials and enabling the vials to be viewed from the exterior of the frame.

Levels are commonly used in many environments in which ambient light is quite low, making it difficult, if not impossible, to read the level to determine if the bubble is in the center of the vial. For example, when a level is used for work in an interior environment, e.g. inside a closet, a cabinet or the like, very little ambient light reaches the level even though the room housing the cabinet may be well lit. Additionally, levels are commonly used in construction applications within buildings that lack lighting or where light is poor, such as in new construction or in some sheds, garages, and barns. In these situations, it is difficult to read conventional levels.

To address this problem, a box beam level has been designed with a luminescent insert disposed below the underside of the vial, which is in the form of a block vial. This type of level employs a unique construction in which the insert is placed in close proximity to the vial, which is not possible with a conventional arrangement in which the vial is exposed within and spans across a space defined by the body of the level. The luminescent insert underlies the block vial and emits light through the vial. In this construction, the luminescent insert has a relatively small surface area capable of emitting light, and does not significantly enhance the ability to read the level in low light conditions, and also requires light in order to function. In addition, the luminescent insert is a separate component that must be produced and assembled into the level.

In view of the foregoing, it is desirable to provide an arrangement for enhancing visibility of a vial in a level having a conventional vial holder construction as described.

SUMMARY OF THE INVENTION

It is an object of the present invention to provide a vial illumination feature for a tool such as a level, which is capable of use in a conventional level construction in which a vial extends across a space defined by a side cover or vial cover arrangement, and which functions to direct light toward the vial from all sides to enhance visibility of the vial. It is a further object of the invention to provide such a vial illumination feature which does not require the production and assembly of a separate component into the level, nor any electronic componentry. It is a further object of the invention to provide such a vial illumination feature which is capable of use in a wide range of level constructions. It is a further object of the invention to provide such a vial illumination feature which is simple in its construction and which does not significantly add to the cost of production of the level.

The invention, which is defined by the claims set out at the end of this disclosure, is intended to solve at least some of the problems noted above. In one form of the invention, a level is provided that includes a web with an opening therein, a level-indicating vial that is adapted for placement within the opening, and a cover that retains the vial and includes at least a portion that engages the vial to retain the vial within the opening. The cover is fabricated from a material that includes a luminescent agent, thereby providing a luminescent cover that emits light such that the vial can be read in low light and no light environments. In one form, the cover includes two sets of opposed sides, and at least one of the opposed sides includes the luminescent agent. Preferably, both sets of opposed sides include the luminescent agent.

In one embodiment, the level includes a side cover arrangement, which includes a cover insert that has multiple vial retaining areas and intermediate areas disposed between adjacent vial retaining areas. Each cover insert is engaged with the web of the frame on opposite sides of the web, and the vial retaining areas of the cover inserts engage the vials to maintain the vials within the web openings. The cover inserts are formed of molded plastic material that is luminescent, and the vial retaining areas are configured to surround the vials to emit light toward the vials from all sides. This embodiment preferably includes a casing that overlies the intermediate areas of the cover inserts and surrounds the web.

In another embodiment, the level includes individual covers for each vial, as opposed to cover inserts that retain multiple vials. Each individual vial cover is an assembly that includes a first cover member and a second cover member configured to be securable to each other on either side of the web. Both the first and second vial cover members are formed to include the luminescent agent, such that the first and second cover members make up an assembly that provides illumination to the vial from all directions, after the level has been exposed to a light source in order to charge the luminescent agent.

Various other features, objects and advantages of the invention will be made apparent from the following detailed description taken together with the drawings.

BRIEF DESCRIPTION OF THE DRAWINGS

Preferred exemplary embodiments of the invention are illustrated in the accompanying drawings, in which like reference numerals represent like parts throughout and in which:

FIG. 6 is a sectional view taken along line 6—6 of FIG. 3;

FIG. 8 is a partial elevation view of a second embodiment of a level in accordance with the invention, incorporating a luminescent individual vial cover arrangement; and FIG. 9 is a sectional view taken along line 9—9 of FIG. 8.

DETAILED DESCRIPTION

Figure 1:
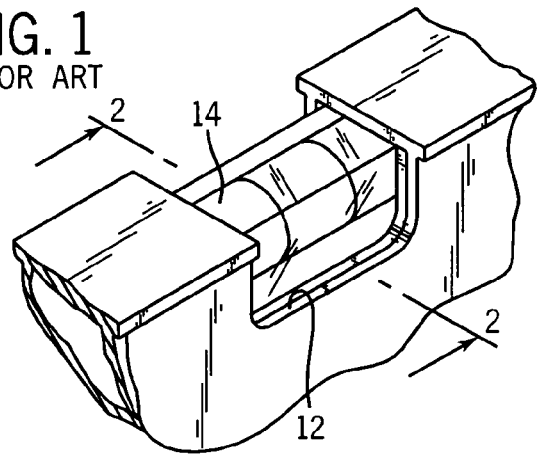
FIG. 1 is a fragmentary, isometric view of a prior art box beam-type level incorporating a luminescent strip.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

Figure 2:
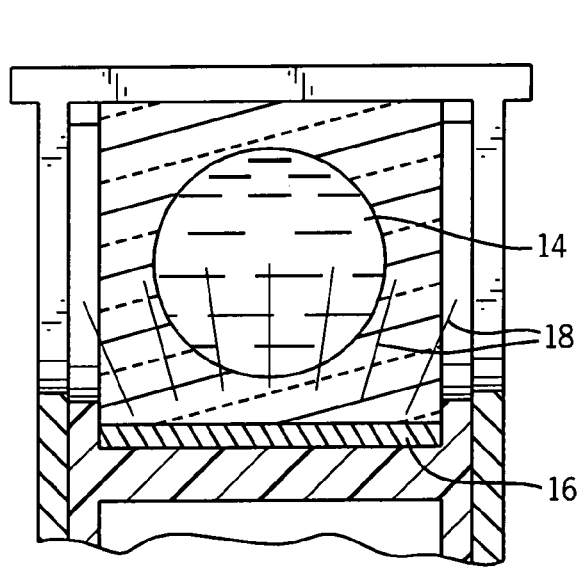
FIG. 2 is a sectional view taken along line 2—2 of FIG. 1.
Figure 3:
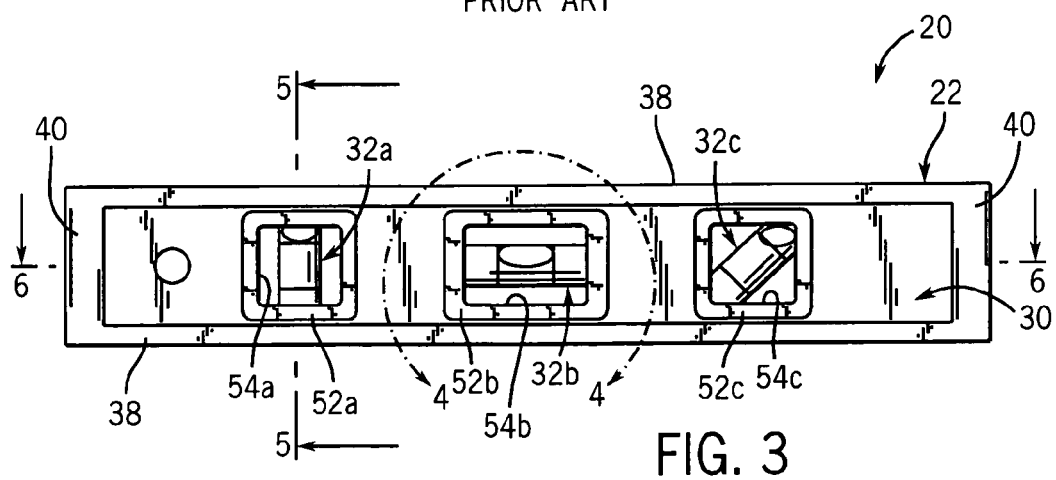
FIG. 3 is a side elevation view of a first embodiment of a level in accordance with the invention, having a frame and luminescent side covers that retain the vials in engagement with the frame.

FIGS. 1 and 2 show a prior art box beam-type level 10 that has a three-sided opening 12 that receives a block vial 14, and a luminescent insert 16 disposed below one side of the vial 14. In low light conditions, light from the insert 16 is directed toward and through the vial 14, as is represented schematically by lines 18 that project upwardly from the insert 16 in FIG. 2. It can be appreciated that having only one side of the vial 14 illuminated does not provide much more visibility to the vial than conventional, non-illuminated levels. Furthermore, the luminescent insert 16 is an additional piece that must be separately fabricated, thus requiring additional tooling for the luminescent insert 16 and also requiring modification of the surrounding parts of the level to accompany the insert 16. Furthermore, the insert 16 must be assembled into the level, which increase the assembly time and cost of the level.

FIGS. 3–7 show a first embodiment of a tool, such as a level 20, made in accordance with the invention. Level 20 includes a frame 22, a pair of side cover inserts 24, 26, and a pair of outer casing members 28, 30. A series of vials 32a, 32b and 32c are engaged with frame 22 and retained within openings 34a, 34b and 34c, respectively, by cover inserts 24, 26. The general construction of the components of level 20 is in accordance with the prior art, such as a level available from Johnson Level & Tool Mfg. Co., Inc. of Mequon, Wis. under its designation #931-9RE.

Vials 32a, 32b and 32c are adapted for engagement within openings 34a, 34b and 34c, respectively, formed in web 36 of frame 20, to position each vial 32a, 32b and 32c in a predetermined orientation relative to level frame 22. Vial 32a extends transversely to the longitudinal axis of frame 22, vial 32b extends parallel to the longitudinal axis of frame 22, and vial 32c extends at a 45° angle diagonally relative to the longitudinal axis of frame 22. In this manner, vial 32a is a plumb vial, vial 32b is a level vial, and vial 32c is a vial that provides a reading relative to a plane of 45° between plumb and level.

In accordance with conventional construction, frame 22 includes a pair of flanges 38 between which web 36 extends, and the outer surface of each flange 38 provides a gauging surface for level 20. Frame 22 further includes a pair of end sections 40 that extend between flanges 38 at the opposite ends of web 36.

Openings 34a, 34b and 34c in web 36 are defined by edges that are formed with opposed notches within which the ends of vials 32a, 32b and 32c, respectively, are received. Each vial 32a, 32b and 32c thus extends across its respective opening 34a, 34b and 34c, such that open space is provided about each vial 32a, 32b and 32c between its ends.

Side cover inserts 24 and 26 are adapted for placement on opposite sides of web 36, and are configured to retain vials 32a, 32b and 32c within the notches in frame web 36. Side cover insert 24 includes a series of retainer sections 42a, 42b and 42c, which define respective openings 44a, 44b and 44c. Intermediate connector sections 46 extend between and interconnect retainer sections 42a, 42b and 42c. Retainer section 42a includes a pair of notches 48a on opposite sides of opening 44a that are configured to engage the ends of vial 32a. Similarly, retainer section 42b includes a pair of notches 48b adapted to engage the ends of vial 32b, and retainer section 42c includes a pair of notches 48c adapted to engage the ends of vial 32c. The inside facing surface of each retainer section 42a, 42b and 42c includes respective peripheral grooves 50a, 50b and 50c.

Side cover insert 26 is formed similarly to side cover insert 24, including retainer sections 52a, 52b and 52c that define respective openings 54a, 54b and 54c, and connector sections 56 that interconnect retainer sections 52a, 52b and 52c. Notches 58a, 58b and 58c are formed in retainer sections 52a, 52b and 52c, respectively, to engage the ends of vials 32a, 32b and 32c, respectively. Retainer sections 52a, 52b and 52c include respective peripheral ribs 60a, 60b and 60c that are adapted to be received within respective grooves 50a, 50b and 50c defined by side cover insert 24, so as to fix the position of side cover inserts 24, 26 relative to each other on either side of web 36.

Openings 44a, 44b and 44c are configured such that vials 32a, 32b and 32c, respectively, are exposed between the opening edges within which respective notches 48a, 48b and 48c are formed. In addition, openings 44a, 44b and 44c are configured to define open space between the respective vials 32a, 32b and 32c and the remaining edges of the respective openings, such that the area of the respective vials 32a, 32b and 32c located within the respective openings 44a, 44b and 44c is exposed on all sides.

Outer side casing members 28, 30 are formed to enclose side cover inserts 24, 26 on opposite sides of web 36. Outer casing member 28 includes an outer wall 62 within which openings 64a, 64b and 64c are formed, such that respective vial retainer sections 42a, 42b and 42c are exposed. Similarly, outer casing member 30 includes an outer wall 66 within which openings 68a, 68b and 68c are formed so as to expose respective vial retainer sections 52a, 52b and 52c of cover insert 26. Side cover inserts 24, 26 and outer casing members 28, 30 are assembled together on opposite sides of frame 22 in any conventional manner, such as by sonic welding, snap-fit adhesive or the like. Side cover inserts 24, 26 are preferably formed of a thermoplastic material such as polystyrene in an injection molding process, although it is understood that any other satisfactory thermoplastic material such as ABS, crystal styrene, acrylic, amorphous nylon, and transparent ABS may be employed, and that other forming methods may also be used. Similarly, outer casing members 28, 30 are formed of a thermoplastic material such as styrene in an injection molding process, although it is again understood that other satisfactory materials and forming methods may be employed.

In accordance with the present invention, side cover inserts 24, 26 are formed of a material that is luminescent, such that cover inserts 24, 26 have a glow in the dark feature. Such luminescence of cover inserts 24, 26 may be provided in any satisfactory manner, such as by incorporating a luminescent agent into the material of side cover inserts 24, 26. In a representative embodiment, side cover inserts 24, 26 are formed of a pigment free thermoplastic material such as polystyrene, and a luminescent agent in the form of a LUMI-NOVA® pigment is incorporated into the pigment free thermoplastic material of side cover inserts 24, 26. The LUMI-NOVA® luminescent agent is available from United Mineral and Chemical Corporation of Lyndhurst, N.J., and is described in U.S. Pat. No. 5,686,022, the disclosure of which is hereby incorporated by reference. The luminescent agent is a phosphorescent phosphor material that absorbs energy from light and then returns the absorbed energy in the form of luminescence in a darkened environment. In a representative embodiment, the luminescent agent is incorporated into the thermoplastic material of cover inserts 24, 26 in a ratio of approximately one (1) part luminescent agent to thirty three (33) parts thermoplastic material. While the LUMI-NOVA® luminescent agent has been found to provide a highly satisfactory luminescent characteristic, it is understood that any other type of luminescent agent may be employed in side cover inserts 24, 26.

Figure 4:
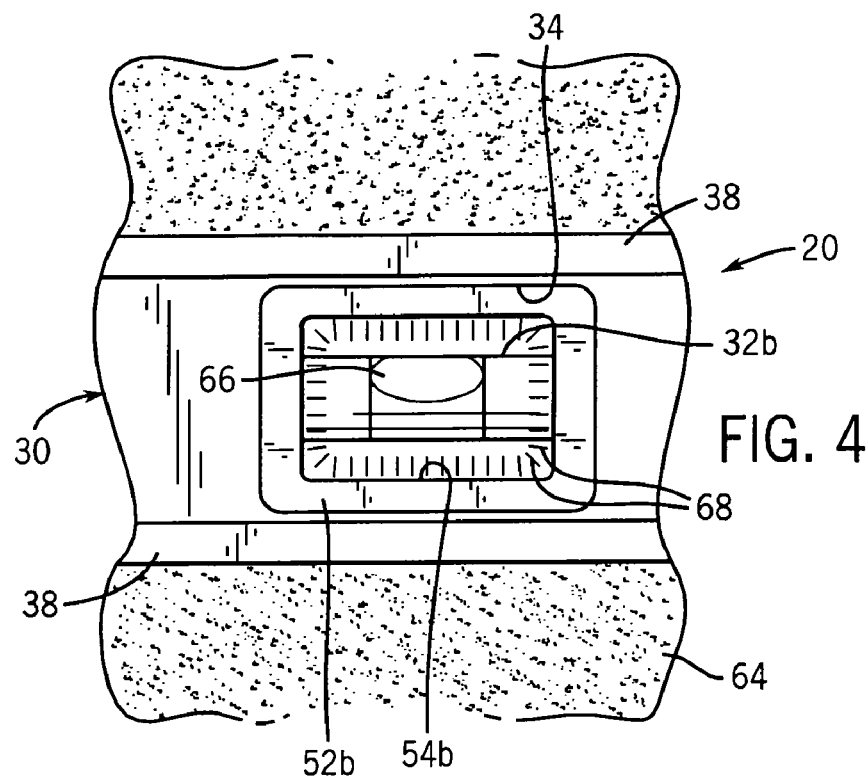
FIG. 4 is an enlarged partial elevation view with reference to line 4—4 of FIG. 3, showing the level in a darkened environment.
Figure 5:
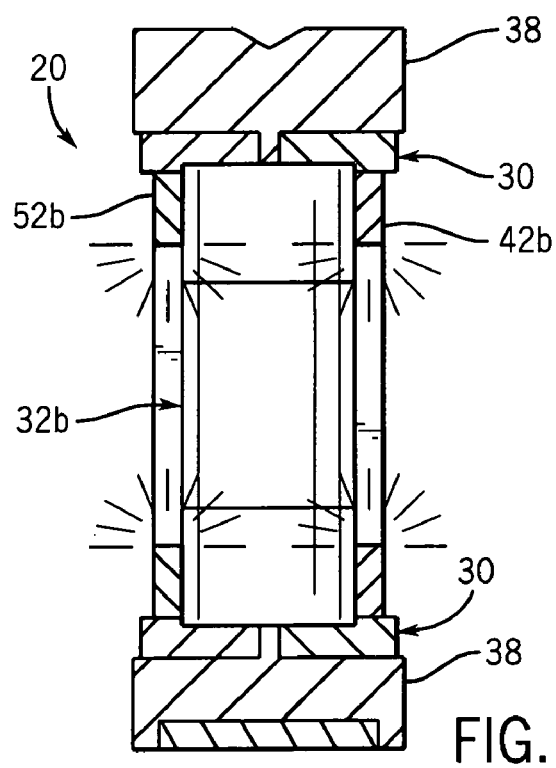
FIG. 5 is a sectional view taken along line 5—5 of FIG. 3.
Figure 7:
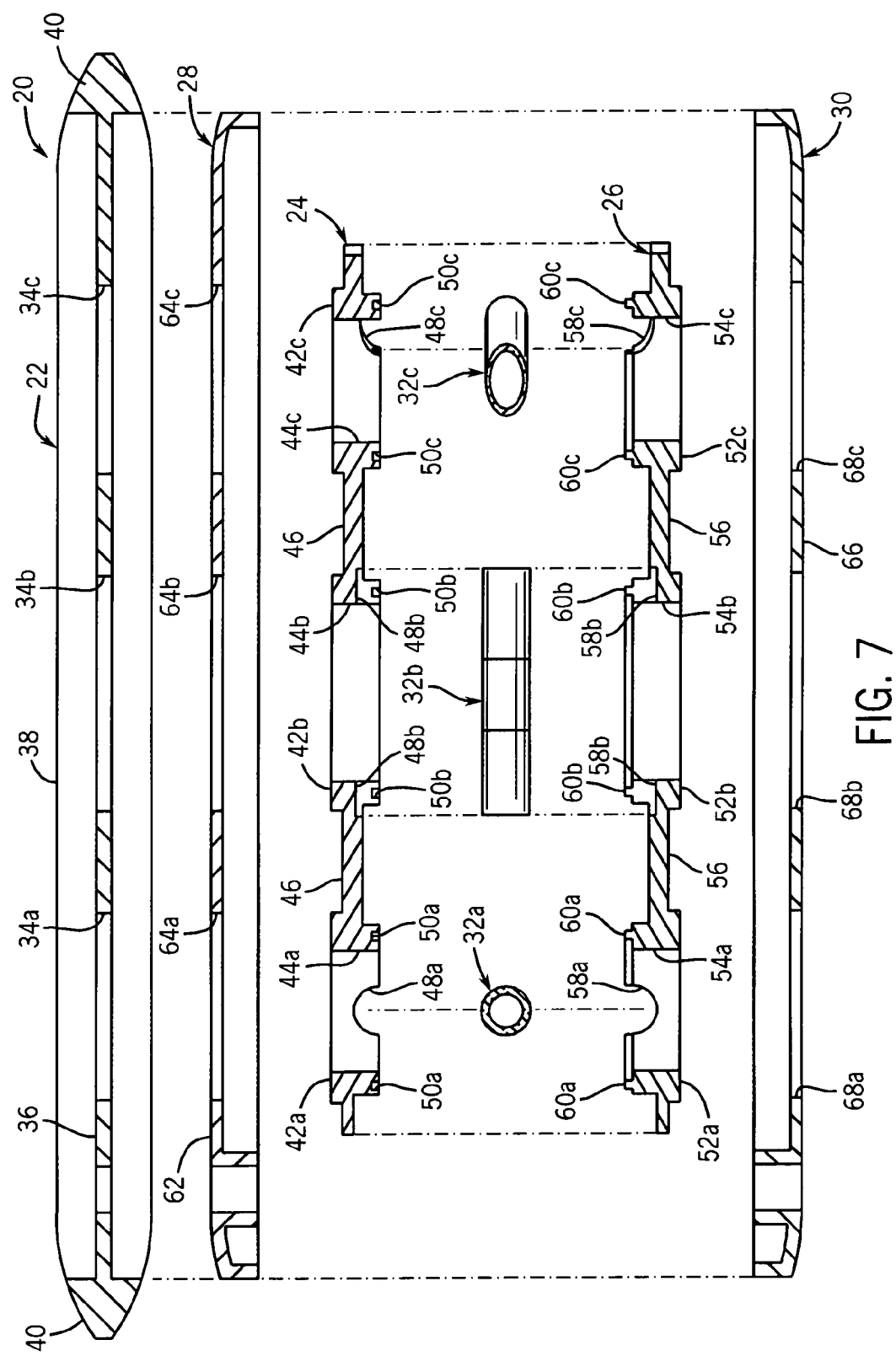
FIG. 7 is a an exploded section view of the level of FIGS. 3 through 6.

As shown in FIG. 4, level 20 is well suited for use in a dark environment, which is illustrated generally at 64. When level 20 is positioned in the dark environment 64, the luminescence of the material of side cover inserts 24, 26, and in particular the exposed retainer sections 42a, 42b, 42c and 52a, 52b and 52c, function to emit light into the surrounding space, including emission of light inwardly into the openings, such as 44b, 54b, defined by side cover inserts 24, 26, respectively. In this manner, each vial insert opening is essentially "framed" by a luminescent structure, in the form of vial retainer sections such as 42b, 52b. The emitted light impinges on the vial contained within the opening, such as vial 32b as illustrated in FIG. 4, to illuminate the vial and to enable the bubble of the vial, shown at 66, to be clearly visible within dark environment 64. Lines 68 represent the emission of light into the space surrounding vial 32b from retainer sections 42b, 52b of side cover inserts 24, 26, respectively. With this arrangement, the space about vial 32b as well as the surfaces of vial 32b are illuminated, and the translucence of vial 32b functions to enable light to pass therethrough so as to enable light to pass into vial 32b and thereby enhance visibility of bubble 66.

The luminescent agent incorporated into the material of side cover inserts 24, 26 preferably provides luminescence for an extended period of time without recharging by exposure to an external light source, to enable level 20 to be used in darkened environment 64 for an extended period of time.

Casing members 28, 30 are preferably formed of a material that is non-luminescent. In this manner, the luminescence of vial retainer sections 42a, 42b, 42c and 52a, 52b and 52c provides a significant contrast when level 20 is in low light conditions, to quickly draw the user's eyes to the bubble vials 32a, 32b and 32c.

While level 20 is illustrated as being a torpedo-type level having a certain construction, it is understood that the luminescent feature of the present invention may be employed in other types of torpedo levels and in any other type of level construction. Another example is illustrated in FIGS. 8 and 9, which illustrate separate vial covers on opposite sides of the web of the level frame, which engage the vial ends and retain the vial in engagement with the level frame. In this embodiment, a level 70 includes a frame 72 having a web 74 and a pair of flanges 75. A bubble vial, such as 76, extends across an opening in web 74, and the ends of vial 76 are received within notches defined by the edges of the opening, in a known manner. Vial covers or holders 78, 80 are located on opposite sides of web 74, and include notches within which the ends of vial 76 are received. With this arrangement, vial covers 78, 80 function to retain vial 76 in engagement with web 74 of frame 72. Vial covers 78, 80 define respective openings 82, 84, and vial 76 extends across openings 82, 84 in the same manner as described previously. The openings, such as 82, 84, are configured such that the opening sides are spaced from the surfaces of vial 76, to define open space between the vial surfaces and the surfaces of vial covers 78, 80 that define openings 82, 84, respectively. In this embodiment, vial covers 78, 80 are formed of a material having a luminescent characteristic, such as a pigment free thermoplastic material having a luminescent material dispersed throughout, as described previously. In this manner, vial covers 78, 80 function to emit light toward vial 76, as shown at 86, when level 70 is placed in a darkened environment.

Representatively, vial covers 78 may have a construction such as is illustrated in Grosz U.S. Pat. No. 4,996,777, the disclosure of which is hereby incorporated by reference, although it is understood that any other satisfactory type of vial holder or retainer construction may be employed.

While the invention has been shown and described with respect to certain embodiments, it is understood that other variations and alternatives are possible and are contemplated as being within the scope of the present invention. For example, and without limitation, the luminescent material that surrounds and illuminates the bubble vial has been shown and described in connection with a level. It is understood, however, that this feature may also be incorporated in any other type of tool that utilizes a bubble vial, especially in an application in which the bubble vial extends through or across a space. In any tool of this type, the material within which the space is formed includes a luminescent characteristic, so that light is emitted toward and onto the vial when the tool is used in a darkened environment. In addition, while the invention has been described with respect to the luminescent material being dispersed throughout the material of the vial holder or vial holding section, it is also understood that luminescent material may simply be applied to the surfaces that face the vial, which provides the same type of illumination in that light is emitted toward and onto the vial in a darkened environment. In the embodiment of FIGS. 1–7, while the entirety of vial cover inserts 24, 26 is described as being formed of a material with a luminescent characteristic, it is understood that the luminescent material may only be incorporated in the vial retaining sections and not in the sections that connect the vial retaining sections. In addition, in a separate vial cover embodiment such as in FIGS. 8 and 9, separate outer vial covers may be formed of a non-luminescent material and separate inner vial retaining sections may be surrounded by the outer sections and define the surfaces that face the vial and engage the ends of the vial. This type of construction avoids forming the entire vial holder of luminescent material, but rather uses luminescent material only in the areas that surround and face the vial. In a wood level, the luminescent material may be incorporated into the plastic material of the vial holders, which are located inside of the lenses through which the vials are viewed.

It can thus be appreciated that the present invention contemplates incorporating luminescent material into existing structure that is utilized to secure a vial in place in a tool. This avoids the need for a separate luminescent member, as in the prior art, so that existing construction can be employed while simply altering the material of construction so as to minimize costs of incorporating the vial illumination feature of the present invention into a tool.

Various alternatives and embodiments are contemplated as being within the scope of the following claims particularly pointing out and distinctly claiming the subject matter regarded as the invention.

I claim:

1. A tool, comprising:
    a body having an opening;
    a bubble vial extending across the opening, wherein the vial defines one or more exterior surfaces; and
    a vial retainer arrangement for securing the bubble vial in position relative to the body, wherein the vial retainer arrangement includes one or more vial retainer members separate from and engageable with both the vial and the body for securing the vial in position on the body, wherein the one or more vial retainer members define one or more inwardly facing surfaces;
    wherein the vial is oriented relative to the body and the vial retainer members such that the one or more exterior surfaces of the vial are located inwardly of the one or more inwardly facing surfaces of the vial retainer members, wherein the one or more inwardly facing surfaces of the vial retainer members face the vial and wherein the one or more inwardly facing surfaces of the vial retainer members and the one or more exterior surfaces of the vial are configured such that an open, unoccupied space is defined between the one or more exterior surfaces of the vial and the one or more inwardly facing surfaces of the vial retainer members; and
    wherein the one or more inwardly facing surfaces of the vial retainer members are formed of a luminescent material, wherein the luminescent material of the inwardly facing surfaces is exposed to the opens unoccupied space between the one or more exterior surfaces of the vial and the one or more inwardly facing surfaces of the vial retainer members, wherein the luminescent material emits light into the open, unoccupied space toward the vial without the presence of a separate light source within the body or within the vial retainer members, wherein the light emitted by the luminescent material passes through the open, unoccupied space between the one or more exterior surfaces of the vial and the one or more inwardly facing surfaces of the vial retainer members and onto the one or more exterior surfaces of the vial to illuminate the vial to provide visibility of the vial when the tool is placed in a darkened environment.

2. The tool of claim 1, wherein the tool comprises a level having a frame, and wherein the one or more vial retainers members engage the frame and the vial to maintain the vial in a predetermined position relative to the frame.

3. The tool of claim 2, wherein the luminescent material comprises the material from which the one or more vial retainers members are formed.

4. The tool of claim 3, wherein the one or more vial retainers members comprise a pair of vial retainers located one on either side of a web defined by the frame of the level, wherein the pair of vial retainers functions to maintain the vial in engagement with the web of the frame.

5. The tool of claim 2, wherein the luminescent material comprises a thermoplastic material having a phosphorescent phosphor material dispersed therewithin.

6. A level, comprising:
    a frame defining at least one opening defined by one or more edges;
    a bubble vial engaged with the frame and extending across the at least one opening, wherein the bubble vial defines a pair of ends and one or more exterior surfaces located inwardly of the one or more edges defining the opening in the frame; and
    a vial retainer arrangement separate from and engageable with the frame and the vial for maintaining the vial in engagement with the frame, wherein the vial retainer arrangement defines one or more inwardly facing surfaces that are located inwardly of the one or more edges of the frame opening and outwardly of the one or more exterior surfaces of the vial so as to define an open, unoccupied space between the one or more exterior surfaces of the vial and the one or more inwardly facing surfaces of the vial retainer arrangement, and wherein the one or more inwardly facing surfaces of the vial retainer arrangement include luminescent means for emitting light toward the vial and onto the one or more exterior surfaces of the vial without the presence of a separate light source associated with the level, wherein the light emitted by the luminescent means passes through the open space from the one or more inwardly facing surfaces of the vial retainer arrangement and onto the one or more exterior surfaces of the vial to illuminate the vial when the level is placed in a darkened environment.

7. The level of claim 6, wherein the vial retainer arrangement comprises one or more thermoplastic vial retaining members adapted to engage the vial and the frame to maintain the vial in engagement with the frame, and wherein the luminescent means comprises a luminescent material dispersed throughout the material of the one or more vial retaining members.

8. A method of illuminating a vial associated with a tool, wherein the vial defines one or more exterior surfaces, comprising the steps of positioning the vial within an opening formed in a body associated with the tool such that the one or more exterior surfaces of the vial are located inwardly of one or more inwardly facing surfaces of the body that define the opening, wherein an open, unoccupied space is defined between the one or more exterior surfaces of the vial and the one or more inwardly facing surfaces of the body that define the opening, and providing a light-emitting material adjacent the opening, wherein the light-emitting material is arranged to emit light through the open space and onto the one or more exterior surfaces of the vial when the tool is placed in a darkened environment, wherein the light-emitting material emits light into the open space and toward and onto the one or more exterior surfaces of the vial, without a separate light source associated with the body of the tool, to illuminate the vial when the tool is placed in a darkened environment, wherein the step of providing light-emitting material adjacent the opening is carried out by placing light emitting material within the material of one or more vial retainer members that are separate from and engageable with the body and with the vial, wherein the vial retainer members maintain the vial in position within the opening in the body of the tool.

* * * * *

UNITED STATES PATENT AND TRADEMARK OFFICE
CERTIFICATE OF CORRECTION

| | | |
|---|---|---|
| PATENT NO. | : 7,024,781 B1 | Page 1 of 1 |
| APPLICATION NO. | : 10/228579 | |
| DATED | : April 11, 2006 | |
| INVENTOR(S) | : Jeffrey P. Cowie | |

It is certified that error appears in the above-identified patent and that said Letters Patent is hereby corrected as shown below:

ON THE FACE

(73) Assignee: Delete "Meguon" and substitute therefore -- Mequon --.

<u>IN THE CLAIMS</u>

CLAIM 1, column 8, line 7, delete "opens" and substitute therefore -- open, --;

CLAIM 2, column 8, line 23, delete "retainers" and substitute therefore -- retainer --;

CLAIM 3, column 8, line 28, delete "retainers" and substitute therefore -- retainer --;

CLAIM 4, column 8, line 30, delete "retainers" and substitute therefore -- retainer --.

Signed and Sealed this

Fifteenth Day of August, 2006

JON W. DUDAS
*Director of the United States Patent and Trademark Office*